United States Patent [19]
Dall'Oglio

[11] Patent Number: 5,299,585
[45] Date of Patent: Apr. 5, 1994

[54] WASHING MACHINE INTEGRATED WITH A TRANSPORTING VEHICLE

[75] Inventor: Erminio Dall'Oglio, Venegono Superiore, Italy

[73] Assignee: Wamash Hoonved Italia S.r.l., Varese, Italy

[21] Appl. No.: 32,801

[22] Filed: Mar. 17, 1993

[51] Int. Cl.⁵ .............................................. B08B 3/10
[52] U.S. Cl. .................................... 134/105; 134/123
[58] Field of Search ............... 134/105, 107, 104.2, 134/104.1, 123, 45, 17

[56] References Cited

U.S. PATENT DOCUMENTS

| | | | |
|---|---|---|---|
| 2,997,048 | 8/1961 | Gertken et al. | 134/123 X |
| 3,022,791 | 2/1962 | Larson | 134/123 X |
| 3,033,215 | 5/1962 | Miller | 134/107 X |
| 3,179,117 | 4/1965 | Gibson et al. | 134/123 X |
| 3,353,546 | 11/1967 | Mahoney | 134/123 |
| 3,477,452 | 11/1969 | Mohamed | 134/107 X |
| 3,698,027 | 10/1972 | Pulliam | 134/123 X |
| 3,901,255 | 8/1975 | Pettit | 134/107 |
| 4,284,127 | 8/1981 | Collier et al. | 134/107 |

*Primary Examiner*—Frankie L. Stinson
*Attorney, Agent, or Firm*—Shlesinger, Fitzsimmons & Shlesinger

[57] ABSTRACT

A washing machine (10) is integrated with a vehicle for its transportation. Said machine (10) comprises at least one chamber (11,12) in which are placed the objects to be washed and containing a plurality of nozzles (13,14,15,16) connected to a water source (22,34). The water is heated by means of heat produced by the operation of an explosion engine for movement of the vehicle. For example, the heat can be taken from the silencer (25) for evacuation of engine combustion fumes.

In addition, the heat can be taken by means of a coil (36) traversed by a vehicle engine cooling liquid.

11 Claims, 2 Drawing Sheets

WASHING MACHINE INTEGRATED WITH A TRANSPORTING VEHICLE

Various situations are known in which periodic washing of voluminous objects with not very high frequency and in any case not such as to justify the purchase of costly industrial washing machines are known.

For example, in the case of bird farms or the like washing of the cages is required periodically or in the case of supermarkets periodic washing of the carts is required etc.. In such cases washing is then performed in a handicraft manner with jets of water directed by hand through a hose. It is clear that such washings cannot give high guarantees of cleanliness.

It could be imagined that an especially equipped cleaning firm haul as necessary a washing machine to the site to perform the occasional washing operation. But an industrial washing machine, especially during the water heating operations, involves relatively high inputs which are not always readily available to those requiring the washing operation.

The general purpose of the present invention is to obviate the above mentioned shortcomings by supplying an innovative vehicle with an integrated washing machine able to perform washing with no need of an external source of high electrical power.

In view of said purpose it has been sought to provide in accordance with the present invention a washing machine integrated with a vehicle for its transportation comprising at least one chamber in which are placed the objects to be washed and containing a plurality of nozzles connected to a water source and at least one of said sources being heated by means of heat exchange with an element emitting heat produced by the operation of an internal combustion engine engine for movement of the vehicle.

Advantageously the heat emitting element can be the silencer or muffler for evacuation of engine combustion fumes. In addition, the heat emitting element can be a coil traversed by a vehicle engine cooling liquid. To clarify the explanation of the innovative principles of the present invention and its advantages compared with the known art there is described below with the aid of the annexed drawings a possible embodiment by way of non limiting example applying said principles. In the drawings.

Figure 1:
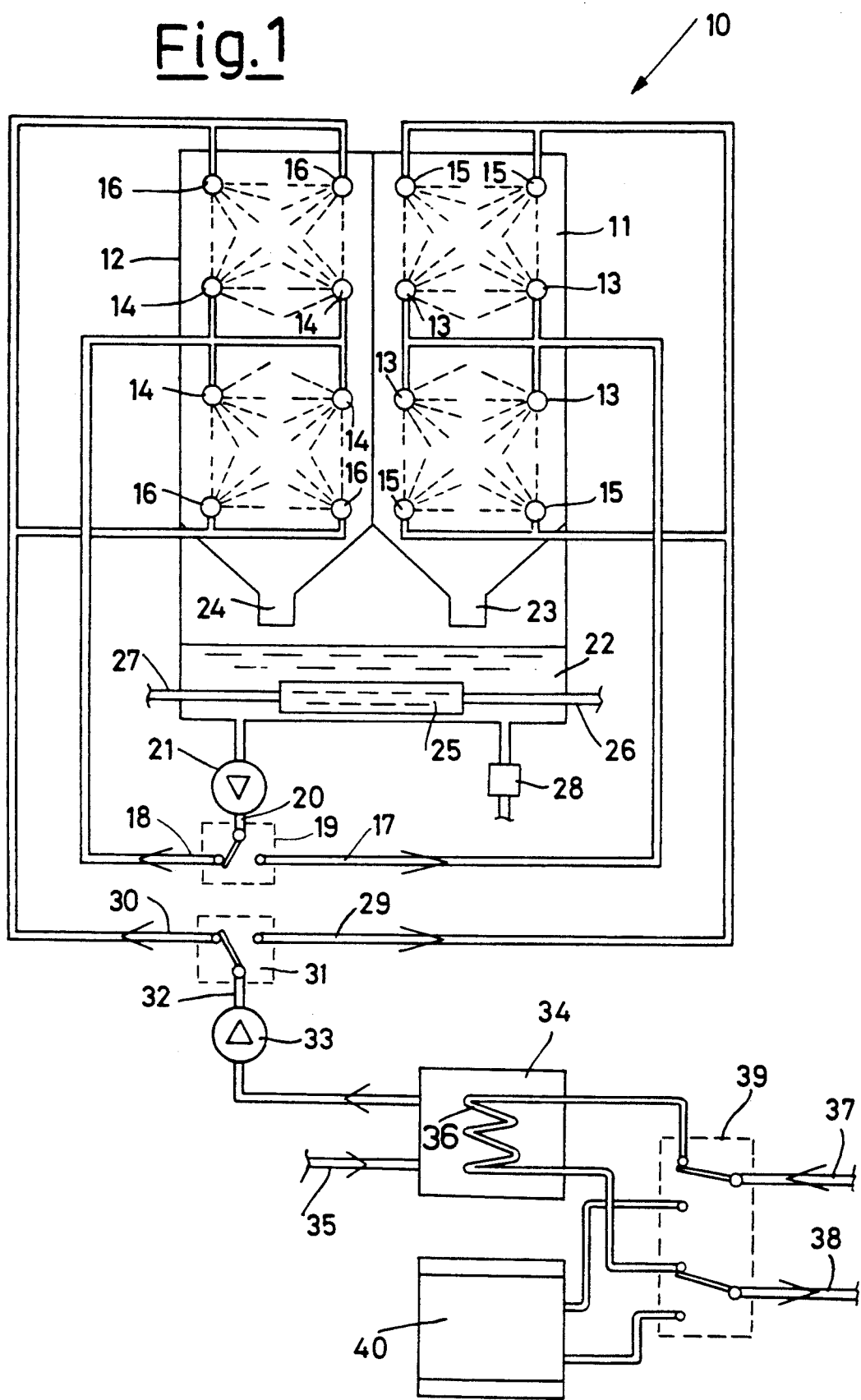
FIG. 1 shows a schematic view of a washing machine in accordance with the present invention.

With reference to the figures a washing machine 10 integrated with a transporting vehicle with internal combustion engine engine such as for example a truck or van comprises advantageously two washing chambers 11 and 12 mounted on the vehicle and containing washing nozzles 13, 14 and rinsing nozzles 15, 16 respectively.

The washing nozzles 13 and 14 of the two chambers are connected to the outlets 17 and 18 of a first exchange valve 19 with inlet 20 connected to the delivery of a pump 21 sucking from the bottom of a tank 22 constituting in this manner a source of water for the nozzles.

The tank 22 receives through the drains 23 and 24 the water which is collected on the bottom of the chambers 11 and 12.

The content of the tank 22 is also in thermal contact with a muffler 25 which through a duct 26 receives the hot exhaust fumes produced by the internal combustion engine (not shown because of known art) of the vehicle to then discharge it into the atmosphere through a duct 27.

For example the thermal contact can be provided by immersion of the muffler in the tank. As an alternative the muffler can also be in contact with an outer wall of the tank.

Finally, the tank 22 comprises a controlled drain 28 (e.g. a solenoid valve) for evacuation of the water from the tank.

As clarified below, the tank 22, the pump 21, the exchange means 19 and the washing nozzles 13 or 14 provide a closed cycle washing circuit.

The rinsing nozzles 15 and 16 of the two chambers are in turn connected to the outlets 29 and 30 of a second exchange valve 31 with input 32 connected to the delivery side of a pump 33 sucking from the inside of a water heater 34 constituting another source of water for the nozzles of the plurality in the chambers.

The water heater has an inlet 35 connected for example to a water source such as for example the water system. Ducts 37 and 38 of outlet and inlet respectively for cooling fluid of the cooling circuit (not shown) of the motor vehicle are connected to exchange valve means 39 which connect them selectively either to a normal radiator 40 of the vehicle or a coil 36 arranged inside the water heater 34.

As clarified below, the water heater 34, the pump 33, the exchange means 31 and the rinse nozzles 15 or 16 provided a rinsing circuit with clean water.

In addition to that which is described above, the washing machine can naturally comprise additional elements of the known art readily imaginable for those skilled in the field and therefore not further described nor shown such as for example thermostats, programmers for control of the washing operations, detersive dispensers, etc. The transportation vehicle is not further shown nor described because it is essentially of the known art readily imaginable for those skilled in the art and substantially with the only modifications of a discharge muffler arranged in the tank 22 and a cooling circuit with path changeable between the radiator and the water heater 34 as described above.

The chambers 11 and 12 can form for example the bed of the vehicle with side and rear doors for inlet thereto. The exchange means 19, 31 and 39 can be multiple-way valves or combinations appropriately connected with one-way valves of a type well known to those skilled in the art and advantageously of the electromechanical type. The pumps 21 and 33 can be advantageously electric pumps powered by the same vehicle electric system or completely mechanical pumps driven by a power takeoff on the vehicle transmission. As an alternative there can be used pumps with electric motor powered through an electrical connection to an external power supply such as for example the normal electric power distribution network. The drive motors of the pumps 21 and 23 can also be provided as hydraulic motors powered by a hydraulic circuit whose pump is driven by the vehicle engine. The hydraulic circuit can also drive additional elements or members of the machine which absorb mechanical work such as for example trucks for movement of objects to be washed for their insertion in and removal from the chambers.

Since one of the problems of known hydraulic circuits is the avoidance of overheating of the oil therein it is conceivable to use the heat generated to perform another heating of the water for example for prewashing analogously to that which is performed for the engine cooling water circulating in the exchanger 36. To better clarify the innovative principles of the present invention there is described below a possible washing cycle to be performed by the machine shown by way of example in the FIG. 1.

Initially the tank 22 is filled by taking water from the water heater 34 through the pump 33 and letting it into the chamber 11 or 12 through the nozzles 15 or 16 respectively.

By operating the engine of the vehicle there are heated and kept hot both the water in the tank (by means of the muffler) and the water in the water heater (by means of the branch provided by the exchange means 39 of the cooling liquid of the engine through the coil 36). After placing in the chamber 11 or 12 of the objects to be washed and selection of the corresponding jets therein with the valves 19 and 31 the first washing phase can start.

In this first phase the water contained in the tank 22 is sucked in by the pump 21 to be sprayed from the jets present in the chamber selected by the exchange means 19 and then returns to the tank 22. In this manner there is provided a closed-cycle washing during which either in the tank 22 or at any point of the washing circuit there are added to the water through known means and therefore not shown appropriate detergents and/or disinfectants. Once the water recirculation phase has been prolonged for sufficient time for cleaning of the objects in the chamber the pump 21 stops and the drain 28 is operated to evacuate from the tank 22 the water which is now dirty. After this the pump 33 which takes the clean water from the water heater is operated and sends it through the appropriately selected exchange means 31 to the chamber where the washing phase was just completed. In this manner there is performed a rinsing by spraying the clean water through the nozzles 15 or 16. The water sprayed is then collected in the tank 22 and optionally recycled from the jets several times. At the end of rinsing the water remains in the tank 22 so as to be used in a subsequent washing cycle. This way there are obtained good water and detergent savings, the rinse water already containing the detergent removed.

The presence of two separate chambers selected by means of activation of the exchange means 19 and 31 permits performance of a washing cycle in one chamber while the other is being filled or emptied. In this manner it is possible to accelerate the washing times of large quantities of objects by eliminating the idle time between washings.

At this point it is clear that the pre-set purposes have been achieved. A washing machine integrated with the elements of an internal combustion engine vehicle used for its transportation permits the performance of washings even of large or numerous objects with no need of external connections to sources of electric energy of high power. If necessary, by the use of accumulation tanks for clean water to be supplied to the water heater and the drain water outlet from the drain 28 it is possible to provide a fully self-sufficient machine not requiring water connections or electrical connections during operation for several complete washing cycles with easily imagined advantages.

Naturally the above description of an embodiment applying the innovative principles of the present invention is given merely by way of example and therefore is not to be taken as a limitation of the patent right claimed here. For example, the hydraulic circuit of the machine can be modified in accordance with the knowledge of those skilled in the art. The washing and rinsing nozzles can be united so as to be fed from the delivery of a single pump with exchange means connecting the intake of said pump alternately to the bottom of the tank 22 during closed-circuit washing and to the outlet of the water heater during rinsing.

The nozzles can also be positioned on known moving arms. Obviously inside the washing chambers will be arranged known supports provided in accordance with the conformation of the objects to be washed as easily imaginable for those skilled in the art to arrange in the most advantageous washing position.

There can also be provided a machine with a single washing chamber even if with the slowing of washings due to the filling and drain operations between successive cycles. Finally, the washing cycles can be different from those indicated. For example, part of the washing water if not excessively dirty can be used by completing it with clean water even for a rinsing, at least partial.

Figure 2:
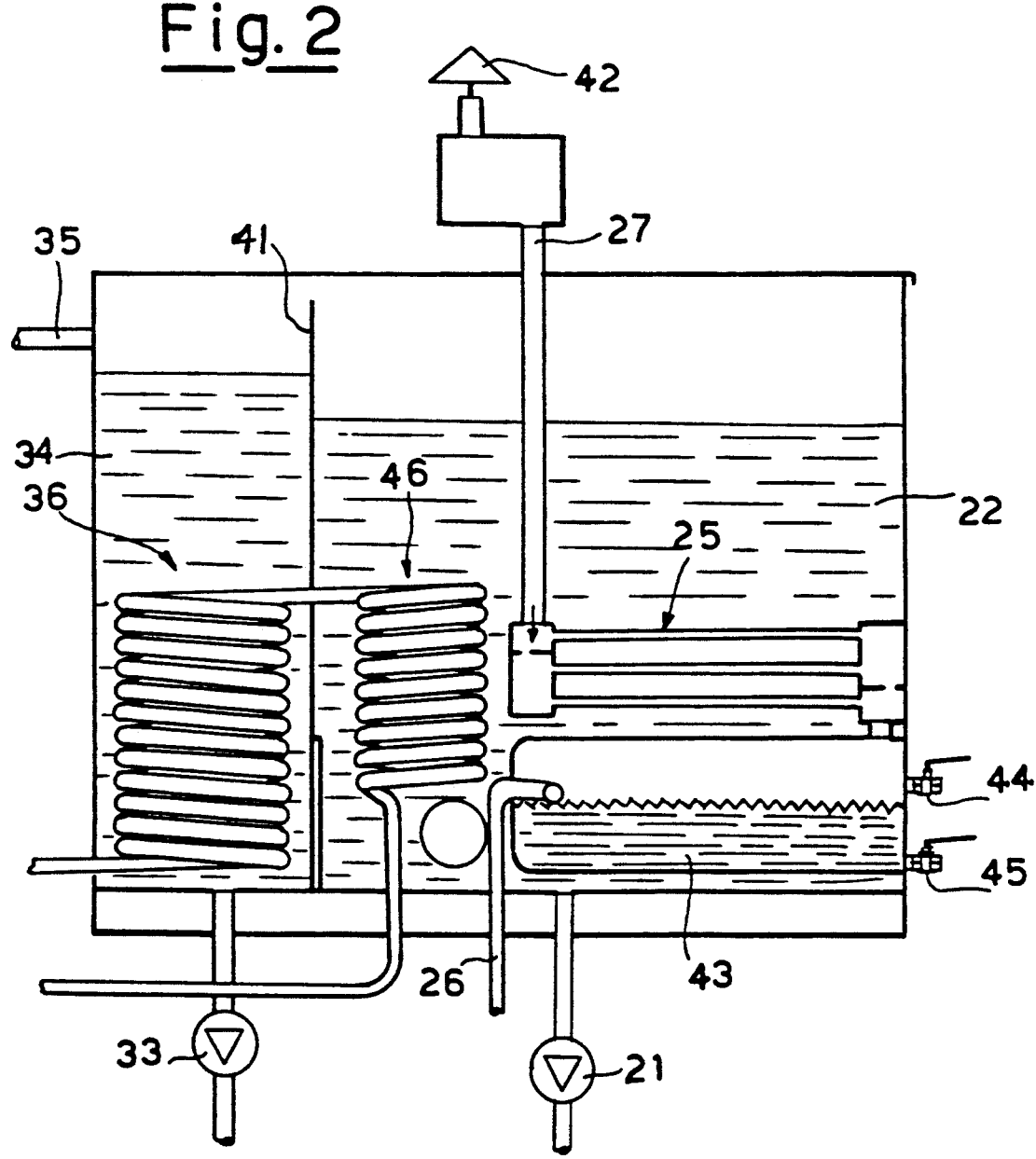
FIG. 2 shows a schematic view of a possible embodiment of elements of the machine shown in the figures.

FIG. 2 shows a possible embodiment of the heat exchange elements.

To increase thermal efficiency the two containers 22 and 34 can be advantageously provided as a single receptacle divided by an intermediate baffle 41.

In the container or tank 22 there is present the heat exchange element 25 traversed by the exhaust fumes of the vehicle engine. For example, the exchange element 25 can comprise a plurality of tubes of ducts traversed by fumes directed to an exhaust stack 42. Advantageously before passing into the exchange tubes 25 the fumes are passed into a washing container 43 partially filled with water which collects the solid impurities of the fumes which could clog the exchange ducts 25. The wash water for the fumes can be periodically replaced by means of taps 44, 45.

In the tank 34 is arranged the coil 36 connected to the engine cooling circuit as described above. To aid the exchanger 25 in heating the wash water present in the container 22 there can also be provided a second coil 46 connected in series with the first coil 36 and immersed in the water of the container 22.

The container 22 can also be arranged otherwise than directly on the bottom of the washing machine as shown schematically in FIG. 1 but be arranged beside the wash chambers and be supplied for example by suction pumps from the bottom of the chambers. As an alternative there may not be provided recycling of the wash water and said water can be taken from the container 22 to be sprayed in the chamber and thence sent to drain.

I claim:

1. Washing machine integrated with a vehicle for transportation thereby, comprising means defining at least one chamber in which objects to be washed are placed, said one chamber containing a plurality of nozzles for spraying water on the objects in said chamber, means for connecting said nozzles to different water sources at least one of which sources comprises a first water accumulation container connectable to an external water source to be filled thereby, the water in said first container being heated by heat exchanger means including a first element emitting heat produced by operation of an internal combustion engine used for effecting movement of the vehicle, said first heat emitting element comprising an exchanger element traversed by the engine combustion fumes, and characterized in that a washing tank partially filled with water is interposed in the path of said fumes between said engine and said exchanger element, whereby before passing into said exchanger element said fumes are passed through said washing tank.

2. Washing machine in accordance with claim 1, characterized in that said washing tank is in thermal contact with said container.

3. Washing machine in accordance with claim 2, characterized in that said washing tank is inserted in the said container.

4. Washing machine in accordance with claim 1, characterized in that said engine is cooled by a liquid, and said heat exchanger means includes a first coil inserted in said first container for connection to said engine cooling liquid to be traversed thereby.

5. Washing machine in accordance with claim 4, characterized in that at least one other of said sources comprises a second water accumulation container connectable to said external water source to be filled thereby, the water in the second container being heated by further heat exchanger means comprising a second element positioned in said second container and operable to emit heat produced by operation of said internal combustion engine.

6. Washing machine in accordance with claim 5, characterized in that said second heat emitting element is a second coil inserted in said second container, said second coil being connected to and traversed by said engine cooling liquid.

7. Washing machine in accordance with claim 6, characterized in that said first and second coils are connected in series with each other.

8. Washing machine in accordance with claim 5, characterized in that said first and second containers are provided as a single receptacle divided by a baffle.

9. Washing machine in accordance with claim 4, characterized in that said heat exchanger means comprises exchange means for selectively conveying the engine cooling fluid between said coil and a radiator of the vehicle.

10. Washing machine in accordance with claim 1, characterized in that there are at least two of said chambers each of which contains two groups of said nozzles, and valve means is operable to connect alternatively nozzles of a respective one of said chambers to one of said sources.

11. Washing machine in accordance with claim 1, characterized in that at least said first container is connected to the bottom of said one chamber for collection of the water sprayed from said plurality of nozzles into said one chamber and means for recycling the water in said container back to said nozzles to be resprayed into said chamber.

* * * * *